3,335,020
MODIFIED CARBON BLACKS
Peter Aboytes, Borger, Tex., and Joseph Iannicelli, Huber, Ga., assignors to J. M. Huber Corporation, Locust, N.J., a corporation of New Jersey
No Drawing. Filed Mar. 2, 1964, Ser. No. 348,806
2 Claims. (Cl. 106—307)

The present invention relates to modified carbon blacks and to the process for preparing them.

More particularly, this invention relates to carbon black treated with benzene which is then polymerized on the carbon black.

Carbon blacks generally are extensively used for many purposes, varying widely as to their characteristics and combination of characteristics by which they are adapted to different specific uses. The rubber, plastic, grease, and ink industries use carbon blacks as a pigment, viscosity controlling agent, filler and the like. There are available to these industries many carbon blacks of the channel and furnace types with varying characteristics which make them useful for many purposes. In recent years carbon black manufacturers have developed methods to tailor the carbon blacks, producing combinations of characteristics and properties useful in specific industries.

The primary object of this invention is to provide a surface modified carbon black and a novel process of producing the same.

A further object of this invention is to provide modified carbon blacks which form a low viscosity dispersion with organic vehicles.

Another object of the invention is to provide a method of modifying carbon blacks with benzene.

A still further object of the invention is to provide a surface modified carbon black which readily disperses in organic vehicles.

Other objects and advantages of the invention will become apparent from the following specification.

In practicing the invention benzene and carbon black are mixed with a Lewis acid catalyst under anhydrous conditions for about 10 minutes. The benzene on the carbon black is then polymerized to parapolyphenyl by means of a combination co-catalyst-oxidizing agent and is thereby bonded to the carbon black. This polymerization takes place at low temperatures in about an hour.

By this process it is possible to graft up to 100% and even more of the polyphenyl onto the carbon black, based on the weight of the carbon black. The amount of modifier on the carbon black is determined by hydrogen analysis.

The percent of modifier grafted on the carbon black varies in accordance with the end use of the product. For example, when the modified carbon black is used in rubber compounding, no more than 10% modifier is normally desirable. If the carbon black is to be used in ink or greases, the amount of modifier is advantageously about 2% to 25%.

As a rule, the more modifier used, the more hydrophobic the carbon black becomes and the greater is the ease in forming low viscosity dispersions in organic media.

The modified carbon blacks of this invention are particularly useful in high temperature greases, inks, plastics, and molded goods such as battery plates.

Among the carbon blacks used in practicing this invention are super abrasion furnace (SAF), high abrasion furnace (HAF), intermediate super abrasion furnace (ISAF), fast extrusion furnace (FEF), and fine burnace (FF).

The catalysts particularly useful in practicing the invention are the Lewis acid catalysts such as aluminum chloride, antimony pentachloride and ferric chloride. Other compounds of this type which are suitable are aluminum bromide and molybdenum pentachloride. The co-catalyst is water.

The oxidizing agents found to be particularly useful include cupric chloride, cupric bromide, lead dioxide, manganese dioxide, or nitrogen dioxide.

When ferric chloride is used as a catalyst to polymerize the benzene on the carbon black, it will also function as an oxidizing agent in combination with the co-catalyst.

The preferred combinations of Lewis acid and oxidant are aluminum chloride-water-cupric chloride, or ferric chloride-water.

The reaction conditions are relatively mild. The materials are combined in an inert atmosphere under anhydrous conditions at room temperature and the polymerization step is carried out at from 25° C. to 45° C. in an aqueous medium for about 1 to 2 hours.

The reaction mixture is added to water, filtered and washed with dilute acid followed by distilled water. This effectively washes off any dissolved salts, unreacted reagents and catalysts.

The following example represents the process of this invention but is not intended to limit the scope of the invention to the specifics recited therein.

EXAMPLE 500 grams of HAF carbon black, dried at 105° C. for 8 hours was placed in a 5 liter, 3 neck round bottom flask. 3 liters (2,637 grams) of anhydrous benzene and 3.2 moles (426.7 grams) of aluminum chloride were added to the reaction flask under an inert nitrogen atmosphere. The resulting mixture was agitated at room temperature under nitrogen for 10 minutes after which 6 milliliters (6 grams) of water were slowly added. 3.2 moles (430.3 grams) of $CuCl_2$ was then added and the resulting mixture was stirred for 1 hour at 37° C. The reaction mixture was added to water, then filtered. The filter cake was washed with 18% hydrochloride acid and then washed with distilled water. The carbon black contained 2% by weight of parapolyphenyl as determined by hydrogen analysis.

The example was repeated using 7.6 moles (1,013.4 grams) of aluminum chloride and 7.6 moles (1,021.8 grams) of $CuCl_2$. The resulting product contained 18% parapolyphenyl. The surface area of the carbon black was not materially changed by the 2% modification as shown in Table I. However, the 18% modification produced some decrease in the B.E.T. surface area.

As can be observed from the above examples when about 12.5 parts of carbon black and about 65 parts of benzene are employed the amount of aluminum chloride may be between 10 and 26 parts, the quantity of water .15 part and the quantity of oxidant between 10 and 26 parts, all parts by weight.

TABLE I

| Percent Modifier | Surface Area, $M^2/g$. | Percent Carbon | Percent Hydrogen |
|---|---|---|---|
| 0 | 71.0 | 97.1 | 0.34 |
| 2.0 | 70.9 | 96.9 | 0.42 |
| 18.0 | 67.2 | 96.6 | 1.20 |

The products were tested in mineral oil dispersion for viscosity. The results are shown in Table II.

TABLE II.—BROOKFIELD VISCOSITY IN POISES AT 30° C

| Pigment | Spindle No. | R.p.m. | | | | | |
|---|---|---|---|---|---|---|---|
| | | 60 | 30 | 12 | 6 | 3 | 1.5 |
| Unmodified carbon black | 3 | 14 | 22 | 43 | 73 | 128 | 232 |
| Carbon black modified with 18% parapolyphenyl | 3 | 7 | 10 | 17 | 27 | 45 | 76 |

The data in Table II indicates that the modified carbon blacks of this invention are superior to unmodified carbon blacks in reducing the viscosity of dispersions in organic media.

The foregoing is illustrative only and additional modifications may be made without departing from the substance of the invention as defined in the appended claims.

We claim:

1. A modified furnace carbon black having grafted to the surface thereof about 2 to 25% parapolyphenyl, based on the weight of the carbon black.

2. A process for the production of modified carbon black which comprises mixing about 12.5 parts by weight furnace carbon black with about 65 parts by weight anhydrous benzene and with from about 10 to about 26 parts by weight aluminum chloride under an inert atmosphere at room temperature for about 10 minutes, then slowly adding .15 part by weight water to the mixture and adding from about 10 to about 26 parts by weight of an oxidant selected from the group comprising cupric chloride and ferric chloride, stirring the mixture for about one hour at from 25° C. to 45° C. and recovering the modified carbon black having from 2 to 25 percent by weight of parapolyphenyl attached thereto.

References Cited

UNITED STATES PATENTS 3,043,708   7/1962   Watson et al. _____ 106—307

HELEN M. McCARTHY, *Primary Examiner.*

TOBIAS E. LEVOW, *Examiner.*

S. E. MOTT, *Assistant Examiner.*